Patented Mar. 26, 1940

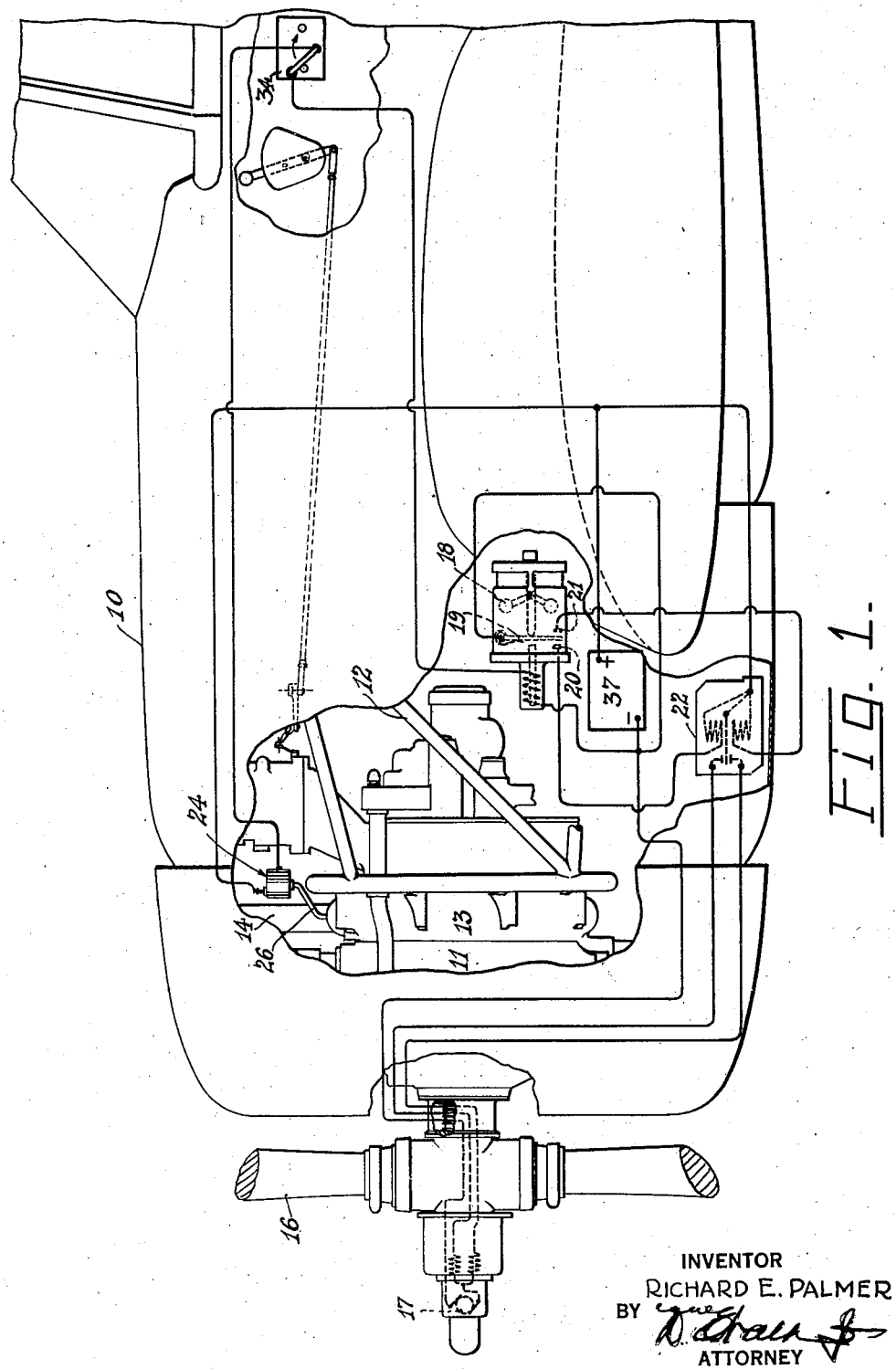
March 26, 1940.   R. E. PALMER   2,195,036
AIRCRAFT POWER PLANT CONTROL
Filed March 5, 1937   2 Sheets-Sheet 1
INVENTOR
RICHARD E. PALMER.
BY
ATTORNEY

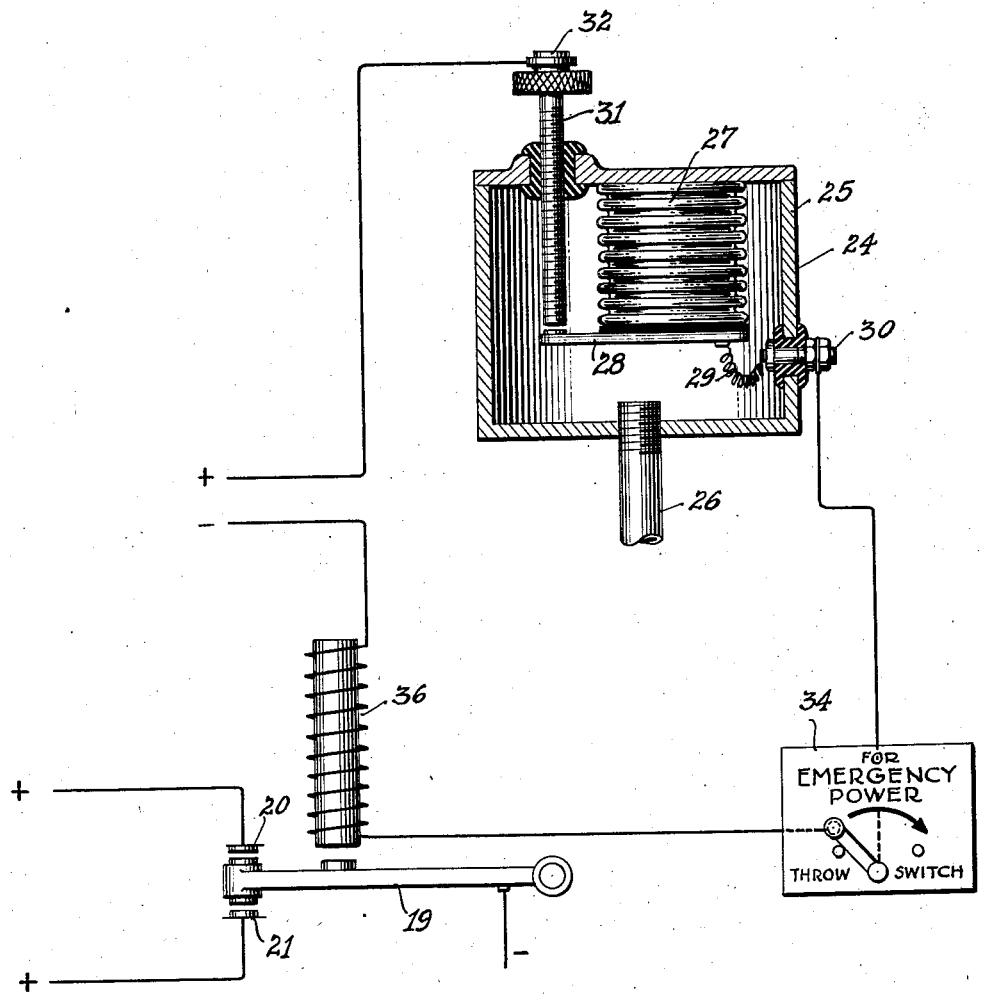

2,195,036

UNITED STATES PATENT OFFICE 2,195,036

AIRCRAFT POWER PLANT CONTROL

Richard E. Palmer, Kenmore, N. Y., assignor to Curtiss-Wright Corporation, a corporation of Delaware Application March 5, 1937, Serial No. 129,179

3 Claims. (Cl. 170—135.6)

This invention relates to control mechanism for aircraft power plants, and is particularly concerned with means for limiting the manifold pressure in a supercharged aircraft engine provided with a constant speed propeller.

An object of the invention is to provide means for reducing engine speed automatically when the supercharge pressure becomes excessive, to limit the power output of the engine.

A further object is to coordinate a manifold pressure-responsive device with the normal control apparatus as utilized in connection with an electrically operated controllable pitch propeller.

A further object is to provide means for biasing a centrifugally controlled governor in accordance with intake manifold pressure of an engine.

The invention is particularly adapted for use in connection with an electrically operated controllable pitch aircraft propeller mounted upon a supercharged engine. Such propellers are currently controlled by an engine speed-responsive device, whereby the propeller blade pitch is increased, to increase propeller load, at such times as the engine tends to run faster than desired, and organized to decrease propeller blade pitch, and thereby decrease the propeller load, at such times as the engine tends to run slower than the desired speed. In an installation of this character, care must be exercised by the air craft pilot in utilizing only that amount of power which will give rise to a manifold pressure condition which is predetermined as to magnitude as being the safe pressure at which the engine can run. In normal flight attitude, the boost afforded by the engine supercharger produces full engine power with full open throttle, the constant speed mechanism of the propeller adjusting the propeller blade pitch for optimum condition to absorb the power output. In low altitude operation, and in take-off, some means is ordinarily utilized to prevent full throttle opening which would tend to raise manifold pressures in the engine to a dangerous degree, producing a greater amount of power than the engine is capable of delivering for a sustained period. Accordingly, a further object of this invention is to provide means for automatically limiting engine power output, at low altitudes, obviating the necessity for conscious attention by the pilot as to the amount of throttle opening. These objectives are broadly accomplished by providing a manifold pressure-responsive device which acts upon the propeller pitch control mechanism, the device acting to increase propeller pitch, thereby increasing air load, at such times as the manifold pressure becomes excessive. Accordingly, this increase in the air load on the propeller slows down the engine and reduces the manifold pressure to a safe point.

The details of the invention may be better understood by referring to the annexed specification and to the drawings, in which similar numbers indicate similar parts, and in which:

Fig. 1 is a side elevation of the forward portion of an aircraft, partly broken away to show the power plant and the device of this invention, and Fig. 2 is a section through the pressure-responsive control mechanism, the figure also showing diagrammatically the electrical connections of the pressure-responsive means with other parts of the power plant control system.

In Fig. 1, I show a conventional aircraft fuselage 10 having an engine 11 mounted upon conventional structure 12, the engine having a supercharger section 13 connected by manifolds 14 to the several cylinders. The engine is provided with a propeller 16 of the electrically operated controllable pitch type wherein an electric motor 17 mounted on the propeller hub is reversely operable to vary the pitch angle of the propeller blades. Such a propeller is shown in detail in the Blanchard Patent No. 1,905,891. Such a propeller is provided with automatic constant speed mechanism comprising an engine-driven governor 18 acting upon an arm 19 contactable with contacts 20 or 21 to close circuits for energizing the motor 17 for blade pitch change. Preferably, the pitch changing circuits include a relay 22 whereby small current intensities in the governor mechanism may break circuits carrying high current intensities for operating the propeller pitch changing motor 17.

I provide a pressure-responsive device 24 mounted upon the supercharger casing in the high pressure portion thereof, the device 24 being shown in detail in Fig. 2. It comprises an airtight housing 25 communicating by a pipe 26 with the supercharger chamber, the housing embracing a sealed metallic bellows 27 which carries a contact arm 28 connected by a flexible wire 29 to a terminal 30. The housing 25 carries an adjustable contact 31 having a terminal 32, the terminals 30 and 32 being connected in series with a switch 34, a solenoid 36 and the power source, shown in Fig. 1 at 37. When manifold pressure becomes excessive, the bellows 27 is collapsed to establish contact between the elements 28 and 31, thus closing the circuit to energize the solenoid 36, when the switch 34 is closed.

The solenoid 36 is arranged as part of the governor unit 18 to act upon the arm 19. When energized, the solenoid 36 attracts the arm 19 to close the circuit with the contact 20, serving to move the propeller blades for increased pitch. In operation, the propeller will ordinarily be pre-set for some definite rotational speed such as, for instance, 2000 R. P. M. With the switch 34 closed, so long as the manifold pressure remains normal, the constant speed propeller will operate normally. However, should the manifold pressure increase unduly, as by opening the throttle too much at low altitude, or in diving the airplane, the bellows 27 will be collapsed, establishing the pitch increasing circuit for the propeller, thereby increasing the propeller pitch, increasing the air load on the engine, reducing the engine speed, and accordingly reducing the manifold pressure. As soon as the manifold pressure has fallen to the proper value, the solenoid 36 will be de-energized and the propeller will assume its normal automatic functioning. Alternately, the condition may be corrected by the aircraft pilot who, sensing the reduction in engine R. P. M., will correct the engine throttle setting, reducing the manifold pressure thereby, whereby the power plant and propeller may resume normal functioning.

The switch 34 is normally closed to provide for automatic manifold pressure limitation. However, since the engine is capable of producing excess power for short periods of time, and since certain maneuvers may require this excess power under emergency conditions, the aircraft pilot may open the switch 34 which cuts out the manifold pressure control, permitting manifold pressures to rise above normal while retaining fully automatic operation of the propeller pitch changing mechanism.

It will be apparent to those skilled in the art that although I have shown the manifold pressure limiting arrangement in connection with the electrically operated controllable pitch propeller, it is within the purview of the invention to provide such means for other types of controllable pitch propellers, or to cause the manifold pressure response to act upon other engine controls for limiting manifold pressure. For instance, it is feasible to have the device 25 function to reduce the throttle setting of the engine, thereby reducing the power and manifold pressure, even though a constant speed propeller may function throughout in a normal manner.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In aircraft, in combination, a supercharged internal combustion engine, a controllable pitch propeller, control means for the propeller comprising an engine driven governor, a member movable by speed fluctuations of said governor, contacts engageable by said member when the governor is over speed or under speed respectively closing circuits to increase and decrease propeller pitch, a solenoid for moving said member to the propeller pitch increasing position, a supercharger pressure-responsive device, and switch means associated with said pressure-responsive device for energizing said solenoid.

2. In an aircraft power plant, in combination, an engine, a controllable pitch propeller driven by said engine, an engine driven governor, a member operated in one direction by a force acting constantly during propeller use and in the other direction by said governor, an element controlled by said member for increasing and decreasing the propeller pitch respectively upon overspeed and underspeed of the engine, and means responsive to excessive engine manifold pressure for overcontrolling said member and operating said member and element to increase propeller pitch.

3. In aircraft in combination, a supercharged internal combustion engine, a controllable pitch propeller, constant speed control means therefor comprising an engine driven governor, a member moved in one direction by a force acting constantly during propeller use and in the other direction by speed fluctuations of said governor, an element controlled by said member for effecting propeller blade pitch change for maintaining said constant speed, a supercharger pressure responsive device, and means responsive to operation of said device for overcontrolling said member and moving said member and element to effect an increase in propeller blade pitch.

RICHARD E. PALMER.